(12) United States Patent
Turpin

(10) Patent No.: US 10,122,308 B2
(45) Date of Patent: Nov. 6, 2018

(54) ADAPTIVE CONTROL SYSTEM FOR A VARIABLE SPEED ELECTRICAL GENERATOR

(71) Applicant: Cummins Power Generation IP, Inc., Minneapolis, MN (US)

(72) Inventor: Mark E. Turpin, Maple Grove, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 34 days.

(21) Appl. No.: 15/229,460

(22) Filed: Aug. 5, 2016

(65) Prior Publication Data

US 2018/0041151 A1     Feb. 8, 2018

(51) Int. Cl.
  *H02P 9/00*     (2006.01)
  *H02P 9/04*     (2006.01)
(52) U.S. Cl.
  CPC ...................................... *H02P 9/04* (2013.01)
(58) Field of Classification Search
  CPC ............................................................. H02P 9/04
  USPC ................................ 322/29, 20; 290/40 B, 40 R
  See application file for complete search history.

(56) References Cited

U.S. PATENT DOCUMENTS

| | | |
|---|---|---|
| 5,563,802 A | 10/1996 | Plahn et al. |
| 6,624,533 B1 | 9/2003 | Swanson et al. |
| 6,737,762 B2 | 5/2004 | Koenig |
| 6,969,922 B2 * | 11/2005 | Welches ............... H02J 3/30 290/1 A |
| 7,353,084 B2 | 4/2008 | Schaper et al. |
| 7,554,214 B2 | 6/2009 | Fattal |
| 7,598,623 B2 | 10/2009 | Fattal et al. |
| 7,786,616 B2 | 8/2010 | Naden et al. |
| 7,855,466 B2 | 12/2010 | Bax et al. |
| 7,999,405 B2 | 8/2011 | Peterson |
| 8,022,572 B2 | 9/2011 | Vyas et al. |
| 8,525,492 B2 | 9/2013 | Peterson et al. |
| 8,946,915 B2 * | 2/2015 | Yu ................... B60L 15/2045 290/40 B |
| 9,729,008 B2 * | 8/2017 | Votoupal ............. H02J 9/066 |
| 2003/0080622 A1 | 5/2003 | Koenig |
| 2006/0052922 A1 | 3/2006 | Koenig et al. |
| 2008/0157593 A1 * | 7/2008 | Bax ................... B60L 11/123 307/10.1 |
| 2010/0236222 A1 * | 9/2010 | Gomez, III ......... F02D 41/029 60/277 |
| 2010/0270864 A1 | 10/2010 | Vyas et al. |

(Continued)

FOREIGN PATENT DOCUMENTS

| | | |
|---|---|---|
| WO | WO-2008/063575 | 5/2008 |
| WO | WO-2008/063580 | 5/2008 |

*Primary Examiner* — Julio C. Gonzalez Ramirez
(74) *Attorney, Agent, or Firm* — Foley & Lardner LLP

(57) ABSTRACT

Systems, apparatuses, and methods are disclosed herein for controlling a variable speed electrical generator. The method includes setting a threshold for a parameter of an output power of the generator set, operating an engine of the generator set at a first speed to provide the output power to a load, comparing the parameter of the output power to the threshold over a plurality of changes in a demand of the load, and determining whether to adjust a speed of the engine from the first speed to a second speed in response to the comparison of the parameter to the threshold.

18 Claims, 4 Drawing Sheets

(56) References Cited

U.S. PATENT DOCUMENTS

| | | | |
|---|---|---|---|
| 2012/0193988 A1* | 8/2012 | Eschrich | H02J 9/062 307/66 |
| 2014/0015257 A1 | 1/2014 | Dobbs | |
| 2014/0210259 A1* | 7/2014 | Bixel | B66C 13/22 307/9.1 |
| 2014/0265569 A1 | 9/2014 | Yu et al. | |
| 2014/0336910 A1* | 11/2014 | Gibson | F02N 11/08 701/113 |
| 2015/0357952 A1* | 12/2015 | Taylor | H02P 9/04 290/40 C |

* cited by examiner

ADAPTIVE CONTROL SYSTEM FOR A VARIABLE SPEED ELECTRICAL GENERATOR

TECHNICAL FIELD

The present disclosure generally relates to variable speed electrical generator sets (gensets). More particularly, the present disclosure relates to systems and methods for adaptively controlling a variable speed genset.

BACKGROUND

A generator set or "genset" is a device that converts fuels such as gasoline or diesel fuel into electrical energy. One of the main components of a generator set is an internal combustion engine. Internal combustion engines typically produce the more shaft power as engine speed increases. Noise and fuel consumption typically increase as speed increases. An engine of a variable speed genset can operate at a speed that varies in accordance with the power demand of the load. When the load is light, the engine operates at a lower speed. When the load is heavier, the speed of the engine can increase in response to the load increase. Thus, fuel consumption can be reduced and emissions and noise associated with the operation of the engine can be minimized. Since the engine may not be able to respond as quickly as the load can increase, the speed of the engine at a light load can include a speed margin to ensure that excess power is available to respond to load increases. The excess power may result in wasted fuel and unwanted emissions and noise.

SUMMARY

A first set of embodiments relates to a method comprising determining a threshold for a parameter of an output power of a generator set, operating an engine of the generator set at a first speed to provide the output power to a load, comparing the parameter of the output power to the threshold over a plurality of changes in a demand of the load, and determining whether to adjust a speed of the engine from the first speed to a second speed in response to the comparison of the parameter to the threshold.

Another set of embodiments relates to an apparatus comprising circuitry configured to determine a threshold for a parameter of an output power of a generator set, operate an engine of the generator set at a first speed to provide an output power to a load, compare the parameter of the output power to the threshold over a plurality of changes in demand of the load, and determine whether to adjust a speed of the engine from the first speed to a second speed in response to the comparison of the parameter to the threshold.

Still another set of embodiments relates to a generator set comprising an engine, a generator coupled to the engine and driven by the engine to generate electrical power, and a controller communicably coupled to the engine. The controller is configured to determine a threshold for a parameter of an output power of the generator set, operate the engine of the generator set at a first speed to provide the output power to a load, compare the parameter of the output power to the threshold over a plurality of changes in demand of the load, and determine whether to adjust a speed of the engine from the first speed to a second speed in response to the comparison of the parameter to the threshold.

These and other features, together with the organization and manner of operation thereof, will become apparent from the following detailed description when taken in conjunction with the accompanying drawings.

DETAILED DESCRIPTION

Figure 1:
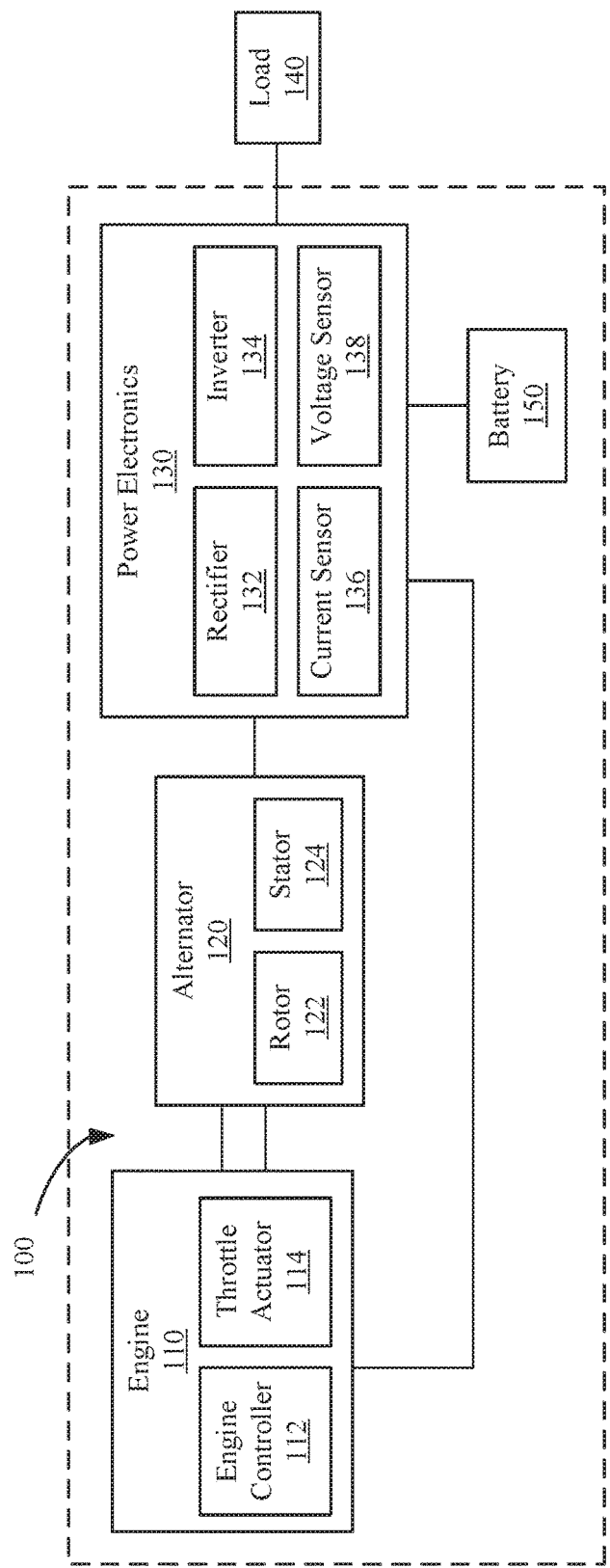
FIG. 1 is a block diagram of a variable speed genset, according to an example embodiment.

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended, any alternations and further modifications in the illustrated embodiments, and any further applications of the principles of the disclosure as illustrated therein as would normally occur to one skilled in the art to which the disclosure relates are contemplated herein.

A variable speed genset can adjust the operating speed of the engine in response to the power demand of the electrical load to the genset, thereby improving fuel efficiency and reducing emissions and noise. Since the engine does not respond as quickly as the load can increase, the operating speed of the engine at a light load can include a speed margin to ensure that excess power is available to respond to abrupt load increases (or step load increases). Some variable speed gensets use a manual switch known as the "eco switch" or "eco throttle," which allows a user to choose between a "normal" mode where the engine operates at a constant high speed and an "economy" mode where the engine operates at a variable speed. When the loads are relatively constant, the user can manually choose the "economy" mode to improve fuel efficiency and reduce emissions and noises. When large step loads are anticipated, the user can manually switch the genset from the "economy" mode to the "normal" mode to provide the capability to pick up the sudden large increase in load. If, however, the user fails to switch the genset to the "normal" mode in anticipation of large step loads, the genset can be stalled by the overload on the engine. Methods to automatically control a variable speed genset are generally desired.

Referring to the Figures generally, the various embodiments disclosed herein relate to systems and methods that utilize adaptive techniques to change the target speed of the engine for a load based, for example, on load history and/or ambient conditions. In some embodiments, the genset may initially start and operate at a speed with a margin high enough to accept largest possible step load increases. For a genset used on a recreational vehicle (RV), the largest step load increase is typically caused by the starting of an air conditioner compressor motor. The speed margin may be initially determined to accept the starting of any type of roof-mounted air conditioner. In practice, the particular model of the air conditioner, configuration of installation, and local conditions may affect the magnitude of the step load increase associated with the air conditioner staring. The genset may record the actual load increases associated with the air conditioner starting on the RV over a period of time. The load increases can be monitored continuously over a plurality load increases. If the magnitude of the actual load increase is less than the initially determined largest possible load increase, the engine that operates at a speed including the initially determined margin may be wasting the fuel and producing unnecessary emissions and noise. Thus, the speed margin of the engine may be adjusted according to the actual load increases collected over the period of time. In another example, the ambient condition (e.g., the ambient temperature) may be monitored for the engine. If the temperature of electronic components and/or the engine exceeds a threshold, which indicates that the genset is operating at a high load in a hot ambient, the operating speed of the engine will be increased so that the speed of a fan (e.g., mechanical fan) can increase thereby increasing cooling air flow and optimizing performance and durability of the genset. In this manner, the target speed of the engine may be continuously and adaptively modified based on operating conditions and/or load history of the genset to achieve optimized noise, emission, and fuel economy characteristics.

Referring now to FIG. 1, a block diagram of a variable speed genset 100 is shown according to an example embodiment. The genset 100 can be used as a power source on vehicles (e.g., RVs), stationary facilities, industrial work machines, etc. to supply electric power to a load 140. The variable speed genset 100 may include an engine 110 as a prime mover, an alternator 120 as an electric machine coupled to and driven by the engine 110, a power electronics 130 coupled to the engine 110 and the alternator 120, and optionally a battery 150 as an energy storage device coupled to the power electronics 130.

The engine 110 may include an internal combustion engine or any other suitable prime mover that consumes fuel (e.g., gasoline, diesel fuel, natural gas, etc.) during operation and provides power to drive the alternator 120 through, for example, a crankshaft (not illustrated in the present Figure). Instead of operating at a fixed constant speed, the engine 110 is capable of operating at a speed that varies in accordance with the magnitude of the load 140. That is to say, when the load 140 is light and relatively little current is output to the load 140 by the genset 100, the engine 110 operates at a relatively low speed. When the load 140 is high and greater current is drawn from the genset 100, the engine 110 operates at a higher speed.

The engine 110 may include an engine controller 112 and a throttle actuator 114 coupled to each other. Other engine components are omitted in the Figure for simplicity. The engine controller 112 is configured to determine a target speed for the engine 110 in response to the power demand of the load 140. The engine controller 112 may be further configured to adjust the actual speed to match or proximate the target speed. In particular, the engine controller 112 may be configured to receive data indicating the magnitude of the load 140 from, for example, a current sensor 136 and a voltage sensor 138, adaptively determines the target speed for the engine 110 in response to changes in the load 140, and sends data indicating the target speed to the throttle actuator 114. It shall be understood that the engine controller 112 may be configured to receive various data indicative of the engine operating conditions and provides additional control commands to the engine 110. The engine controller 112 may be implemented as an electronic control unit (ECU). The structure and operations of the engine controller 112 will be discussed in detail below with reference to FIG. 2. The throttle actuator 114 may include an electric motor configured to adjust the speed of the engine 110 by opening the throttle valve (not illustrated in the present Figure) to a desired angle in response to receiving the control data from the engine controller 112.

The alternator 120 is operatively and communicably coupled to the engine 110 and may be powered by the engine 110 to generate electric power for running the load 140. The alternator 120 may include an induction machine, a switched reluctance machine, or any other suitable electric motor or generator capable of generating electrical output in response to mechanical input, or mechanical output in response to electrical input. In some embodiments, the alternator 120 may be a starter/alternator, integrating the functions of a starter motor and an alternator used in the engine system. The alternator 120 may include a rotor 122 and a stator 124. Other alternator components are omitted in the Figure for simplicity. The rotor 122 may be a permanent magnet or field coils structured to generate a magnetic field. The stator 124 may include windings (e.g., three-phase windings) wound on iron cores (i.e., the armature windings). It shall be understood that the stator 124 may include windings of any suitable phases and constructed of any suitable material. In some embodiments, the rotor 122 may be surrounded by the armature windings of the stator 124.

The engine 110 can drive the rotor 122 to rotate, thereby generating a moving magnetic field around the stator 124 and inducing a voltage difference between windings of the stator 124. As the operating speed of the engine 110 varies, the rotational speed of the rotor 122 varies accordingly, causing the frequency and magnitude of the output alternate current (AC) power of the alternator 120 to change. In some embodiments, the alternator 120 may include an automatic voltage regulator (AVR) (not illustrated in the present Figure) configured to regulate the magnitude of the output voltage of the alternator 120. The AVR may be structured to control the excitation voltage applied to a field winding in the alternator 120. The level of the field current determines the strength of the magnetic field, therefore determines the magnitude of the output voltage of the alternator 120.

The power electronics 130 may be configured to keep the frequency and magnitude of the output AC voltage of the alternator 120 to remain relatively constant, in some embodiments. The power electronics 130 may include circuitry configured to manage the electrical power generated, such as a rectifier 132 and an inverter 134. The rectifier 132 may be electrically coupled with the windings of the stator 124 and configured to convert the AC power output by the alternator 120 to a direct current (DC) power. In some embodiments, the rectifier 132 includes a six-diode configuration applicable to three-phase AC to DC conversion. In particular, the rectifier 132 receives the three-phase AC power output from the alternator 120 and converts the three-phase AC voltage to a corresponding DC voltage. It shall be understood that the AC power output from the alternator 120 may be of any suitable phases and that the rectifier 132 can include any suitable configuration to convert the AC power to the DC power. In some embodiments, the power electronics 130 may include a filter (not illustrated in the present Figure) disposed between the output of the alternator 120 and the rectifier 132 and configured to remove certain time varying characteristics from the AC output by the alternator 120 to avoid undesirable interference.

The inverter 134 is configured to convert the DC voltage output from the rectifier 132 to an AC voltage with desired frequency and magnitude. In some embodiments, the inverter 134 includes an H-bridge configuration with four insulated gate bipolar transistors (IGBTs) controlled by pulse width modulated (PWM) signals. It shall be understood that the inverter 134 can include any suitable switches such as field effect transistors (FETs), gated thyristors, silicon controller rectifiers (SCR), etc. The PWM control signals may selectively and individually drive each gate/switch of the inverter 134 to synthesize the output of the inverter 134 to, for example, an approximate sinusoidal AC waveform.

The power electronics 130 may further include a current sensor 136 configured to monitor the output AC current of the genset 100 and a voltage sensor 138 configured to monitor the output AC voltage of the genset 100. The AC current detected by the current sensor 136 and the AC voltage detected by the voltage sensor 138 correspond to the electric power delivered to the load 140 by the genset 100. The detected AC current and voltage can be used as a feedback for the inverter 134 to generate the PWM control signals for synthesizing the approximate sinusoidal AC waveform. In addition, the current sensor 136 and the voltage sensor 138 may be communicably coupled to the engine controller 112 and send data indicating the detected AC current and voltage for the engine controller 112 to determine the power output, i.e., the speed of the engine 110. The process of determining the engine speed in response to the power demand of the load will be discussed below in detail with reference to FIG. 4. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a CAN bus provides the exchange of signals, information, and/or data. The CAN bus includes any number of wired and wireless connections.

The load 140 may include various types of electric equipment, such as one or more air conditioners, lighting, kitchen appliance, entertainment deices, and/or other different devices. The operating speed of the genset 100 is determined responsive to the power demand of the load 140. When the load 140 is light, the engine 110 operates at a relatively low speed. When the load 140 is high, the engine 110 operates at a higher speed. The AC current and voltage output to the load 140 may be monitored by the current sensor 136 and the voltage sensor 138.

In some embodiments, the variable speed genset 100 may further include the battery 150 electrically coupled to the power electronics 130. The battery 150 may include any type of rechargeable battery and of any suitable size. That is to say, the battery 150 may be implemented as any type of electrical energy storing and providing device, such as one or more capacitors (e.g., ultra capacitors), Lithium-ion batteries, Nickle-Metal Hydride batteries, Lead-acid batteries, etc. The power electronics 130 may be configured to manage the electrical power generated and stored with the genset 100. In particular, the power electronics 130 may selectively charge the battery 150 by providing the DC power to the battery 150 in certain situations through a DC bus (not shown in the present Figure) disposed between the rectifier 132 and the inverter 134. The power electronics 130 may also selectively draw DC power from the battery 150 in other situations through the DC bus.

Figure 2:
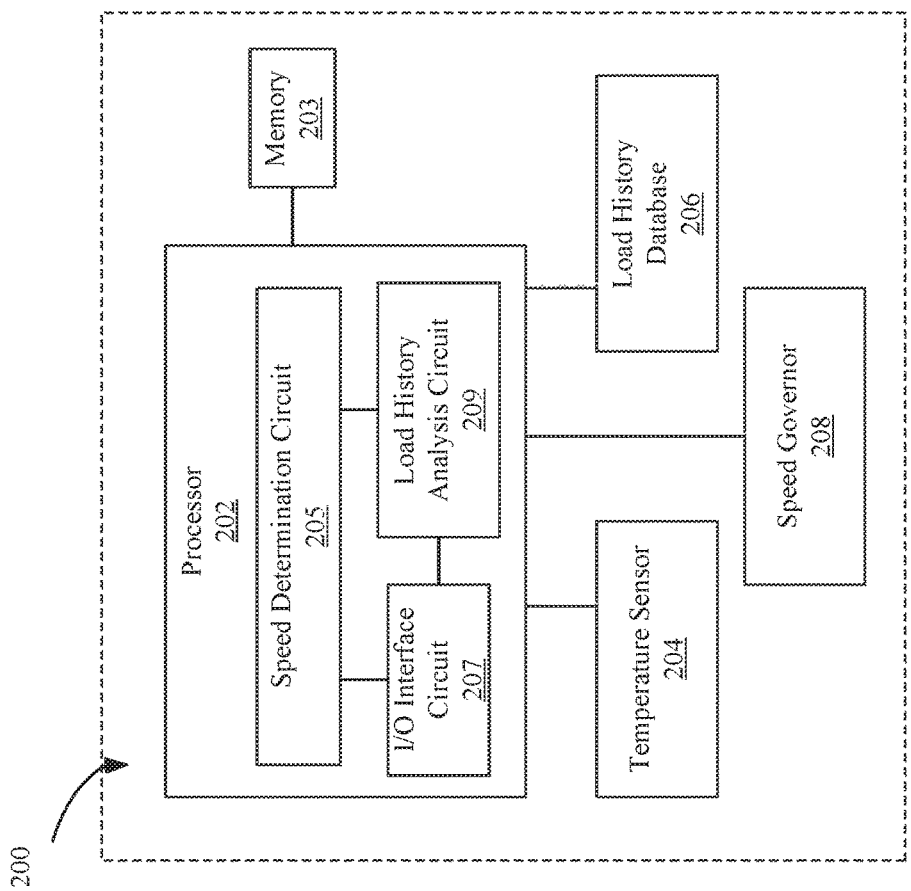
FIG. 2 is a block diagram of an engine controller used with the genset of FIG. 1, according to an example embodiment.

Referring to FIG. 2, a block diagram of an engine controller 200 is shown according to an example embodiment. The engine controller 200 may correspond to the engine controller 112 used with the genset 100 of FIG. 1. The engine controller 200 may include a processor 202 coupled to a temperature sensor 204, a load history database 206, and a speed governor 208. As discussed above, the engine controller 200 may be configured to determine a target speed for the engine based on the load and adjust the actual speed to match or proximate the target speed. In particular, the processor 202 may be configured to determine the target speed for the load based on load history data stored in the load history database 206 and/or the ambient condition (e.g., ambient temperature) monitored by the temperature sensor 204, and command the speed governor 208 to adjust the actual speed to match or proximate the target speed.

In some embodiments, the operating speed of the engine can vary over a predetermined speed range in response to changes in the load. The genset may operate at a steady state low (e.g., minimum) speed at the lower end of this speed range corresponding to low power output and a steady state high (e.g., maximum) speed at the upper end of this speed range corresponding to high power output. Between the lower limit and the higher limit, the genset can operate at a variable speed concomitant with the power demand of the load. In further embodiments, different nominal operating speeds for different anticipated load levels may be provided for reference in the form of one or more predetermined relationship. The predetermined relationship may preliminarily suggest operating parameters by which the genset is likely to perform with optimum performances and efficiency. For a given load level, the processor 202 may refer the power-speed relationship to determine the target speed of the engine, and adjust the actual operating speed of the engine to match or proximate the target speed.

The processor 202 may be structured to selectively execute instructions, commands, and the like stored by the memory 203. The processor 202 may be implemented as a general-purpose processor, an application specific integrated circuit (ASIC), one or more field programmable gate arrays (FPGAs), a digital signal processor (DSP), a group of processing components like mentioned above, or any other suitable electronic processing components. The memory 203 (e.g., NVRAM, RAM, ROM, Flash Memory, hard disk storage, etc.) may store data and/or computer code for facilitating the various processes described herein. Accordingly, the memory 203 may be or include tangible, non-transient volatile memory or non-volatile memory. In some embodiments, the processor 202 includes an Input/Output (I/O) interface circuit 207 structured to receive various inputs from and provides control commands to other components in the controller 200. The processor 202 further includes a load history analysis circuit 209 structured to analyze the data stored in the load history database 206, and a speed determination circuit 205 structured to determine the speed of the engine.

The temperature sensor 204 may be any suitable sensor or sensors configured to monitor the temperature of electric components and/or engine oil, coolant, or other surrogate in the engine. There may be multiple temperatures sensor monitoring difference components and/or surrogate in the engine. The temperature sensor 204 may be communicably coupled to the processor 202 (e.g., through the I/O interface circuit 207) and configured to generate data indicating the detected temperature for the use of the processor 202. When the temperature exceeds a predetermined threshold temperature, which indicates that the genset is operating at a high load in a hot ambient, the processor 202 (e.g., through the speed determination circuit 205) may determine to increase the engine speed in order to increase the flow of cooling air.

Figure 3:
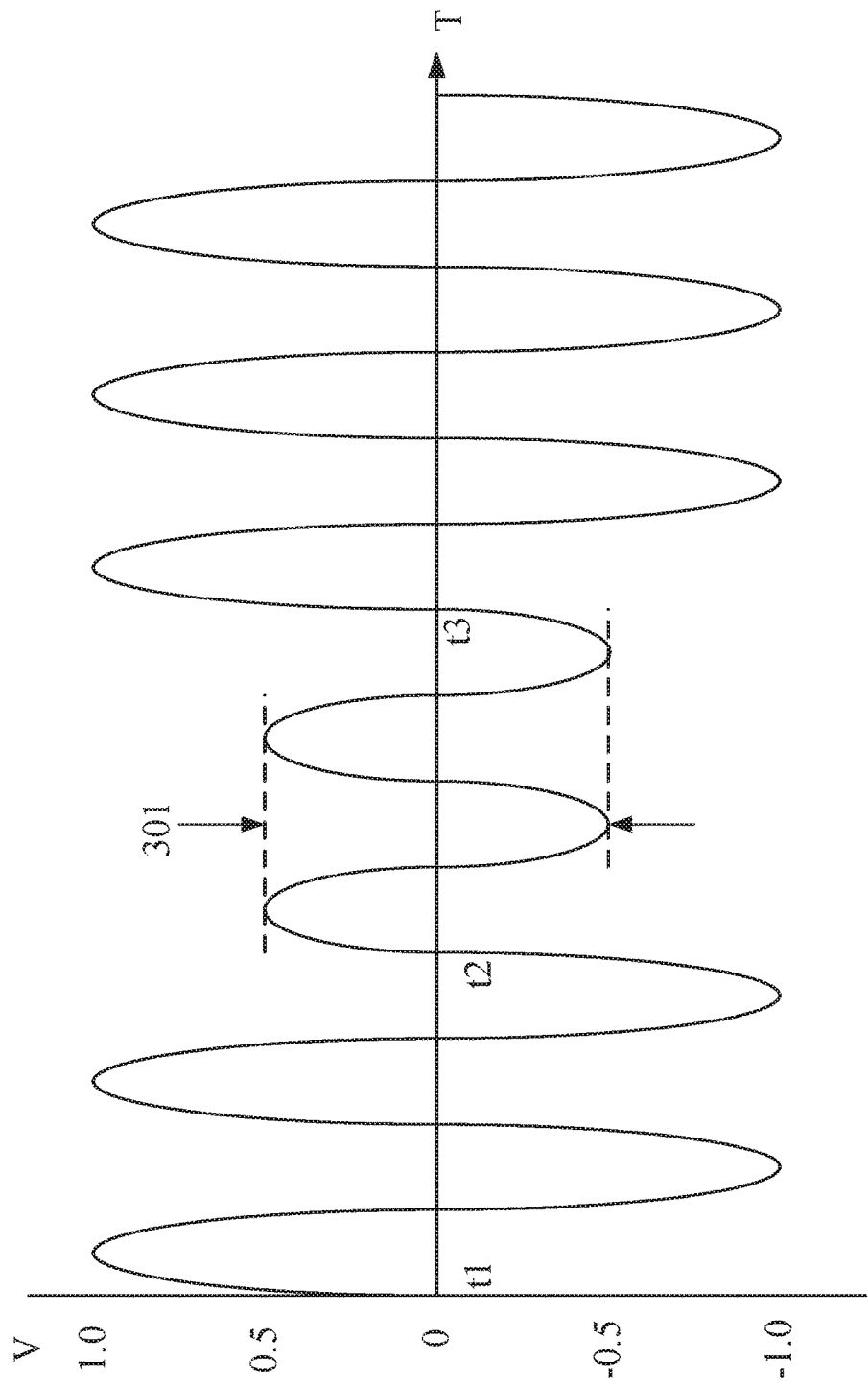
FIG. 3 is a schematic graph illustrating a voltage dip associated with an increase in the power demand of a load.

The load history database 206 may hold, store, categorize, and otherwise serve as a repository of load response history data and/or load history data. Abrupt increase (i.e., step increase) in the load 140 such as air conditioner compressor motors starting can cause voltage dips in the output AC voltage of the genset 100, which may be captured by the voltage sensor 138. FIG. 3 shows an example of voltage dips. From time t1 to t2, the genset 100 outputs a constant voltage, for example, the nominal voltage. At time t2, an air conditioner compressor motor starts and a step load increase occurs. The abrupt increase in the load causes a decrease in the output voltage of the genset 100, which is shown as voltage dips 301. Upon detecting the increase in power demand of the load, the engine 110 and/or the power electronics 130 can increase the output power of the genset 100 by, for example, increasing the engine speed and/or adjusting the PWM control signals. At time t3, the output power catches up the new power demand of the load 140 and the output voltage goes back to the nominal level. The load history database 206 may record the magnitude of the voltage dip (e.g., 0.5 nominal level in FIG. 3) associated with the start of the air conditioner. The load history database 206 may record a plurality of instances of voltage dips over time each associated with a start of the air conditioner. In some embodiments, the load history database 206 stores historical data of load level, such as load level at various time of the day, various days of a week, etc.

The processor 202 (e.g., through the load history analysis circuit 209) can compare the magnitude of the voltage dips associated with the start of the air conditioner with a threshold magnitude of voltage decrease. In some embodiments, the threshold magnitude may correspond to a maximum possible voltage dip caused by a largest possible step load increase that can happen to a particular genset. For a genset used on a recreational vehicle (RV), for example, the largest step load increase is typically caused by the starting of the air conditioner compressor motor. The speed margin may be initially determined to accept the starting of any type of roof-mounted air conditioner. In practice, the particular model of the air conditioner, configuration of installation, and local conditions may affect the magnitude of the step load increase associated with the air conditioner staring. If the magnitude of the actual load increase is less than the initially determined largest possible load increase, the engine that operates at a speed including the initially set margin may be wasting the fuel and producing unnecessary emissions and noises. Thus, if the processor 202 (e.g., through the load history analysis circuit 209) decides that the magnitude of the voltage dips collected over time is less than the threshold magnitude of voltage decrease, the processor 202 (e.g., through the speed determination circuit 205) may determine a target speed that has a speed margin to accept the actual load increase corresponding to the magnitude of voltage dips collected over time. In further embodiments, the pattern of historical load level recorded in the load history database 206 may be used for determining the threshold magnitude of voltage decrease. For example, at a time of a day when the load level is anticipated to be high, the threshold magnitude of voltage decrease can be set lower; when the load level is anticipated to be low, the threshold magnitude of voltage decrease can be set higher. The load response history data and load history data may be updated dynamically. When the genset works at different locations (e.g., on a RV travelling at different locations), the magnitude of the voltage dips associated with the air conditioner starting may vary.

The processor 202 is communicably coupled with the speed governor 208 (e.g., through the I/O interface circuit 207) and configured to transmit to the speed governor 208 data indicating the determined target speed. The speed governor 208 may be configured to change the operating speed of the engine 110 by adjusting the engine fueling through, for example, the throttle actuator 114, in response to the data received from the processor 202. The throttle actuator 114 may in turn open the throttle valve to a desired angle for the determined target speed. The speed governor 208 may include an automatic speed governor proportional-integral-derivative (PID) circuit. It shall be understood that although the speed governor 208 is shown to be a component of the engine controller 200, the speed govern 208 can be included in the power electronics 130 in other embodiments.

Figure 4:
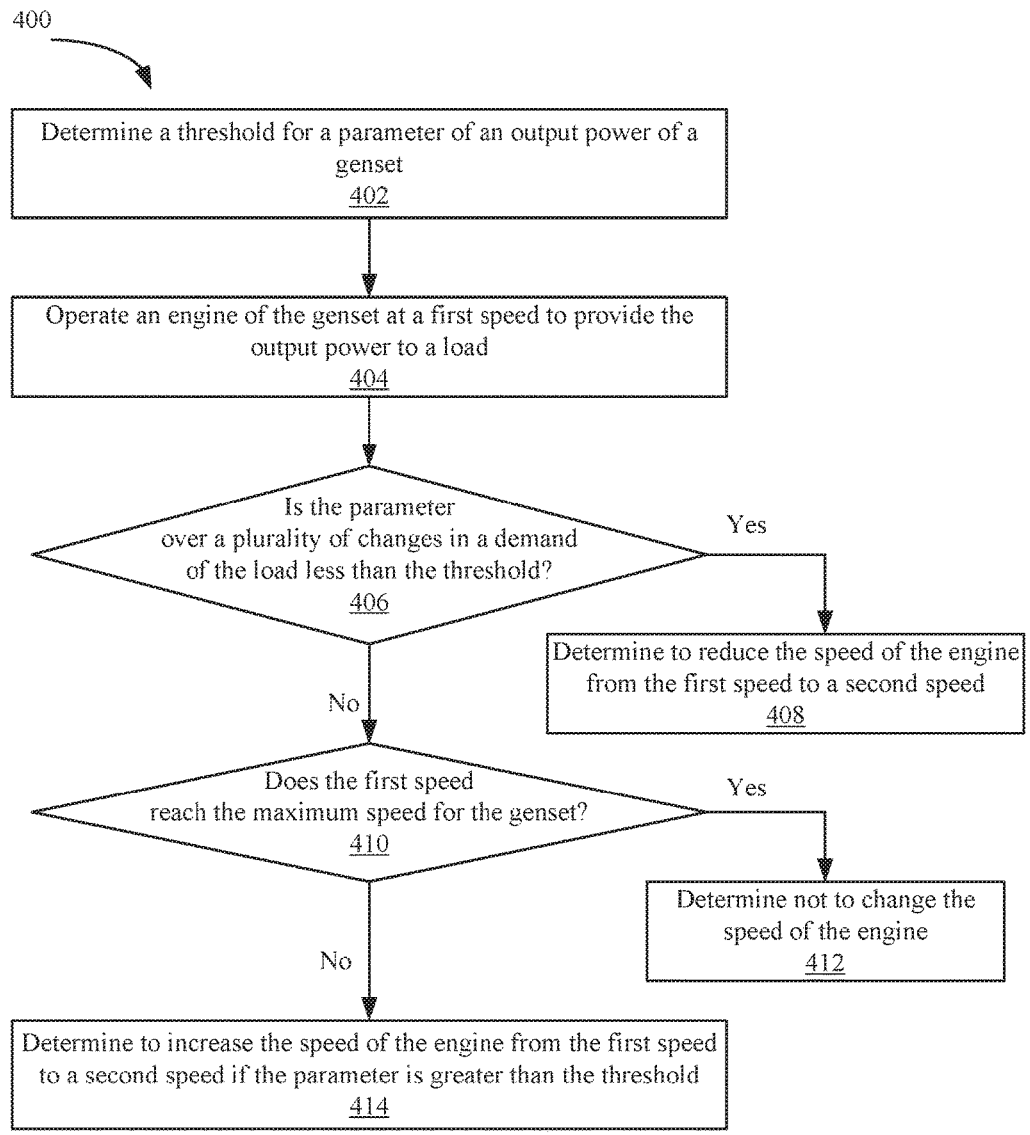
FIG. 4 is a flow diagram of a method for controlling the variable speed genset, according to an example embodiment.

Referring now to FIG. 4, a flow diagram a method 400 for controlling the variable speed genset is shown according to an example embodiment. The method 400 may be performed by the engine controller 200 in FIG. 2.

At process 402, a threshold for a parameter of the output power of a variable speed genset is determined. In some embodiments, the parameter may include a magnitude of a voltage decrease associated with a largest possible step load increase for the genset. For example, the parameter may include a magnitude of a voltage dip associated with the start of an air conditioner compressor motor for a genset used on a RV. It shall be understood that for gensets used in other settings, the largest possible step load increase may be caused by other types of load. Initially, the threshold magnitude may correspond to a maximum possible voltage dip caused by the worst-case step load increase (e.g., the start of any roof-mounted air conditioner). Over time, the initial magnitude may be replaced with a new threshold determined by the engine controller based on the load response history. For example, the particular model of the air conditioner, configuration of installation, and local conditions may result in variations in the magnitude of the voltage decrease corresponding to the air conditioner starting. The engine controller may utilize the history of magnitude of the voltage decrease collected over a plurality of changes associated with the air conditioner starting to determine a new threshold. In further embodiments, the threshold magnitude of voltage decrease may be decided based on the pattern of historical load level. For example, at a time of a day when the load level is anticipated to be high, the threshold magnitude of voltage decrease can be set lower; when the load level is anticipated to be low, the threshold magnitude of voltage decrease can be set higher.

At process 404, the engine of the genset is operated at a first speed to provide the output power to the load. As discussed above, the engine speed can vary in a speed range with a minimum speed at the lower extreme corresponding to low power output and a maximum speed at the upper extreme corresponding to high power output. In some embodiments, the first speed is a speed that varies with the power demand of the load and includes a speed margin that can accept the load increase corresponding to the threshold magnitude of voltage decrease set in the process 402, if the addition of the speed margin does not make the first speed beyond the maximum speed in the speed range. If the addition of the speed margin will make the first speed to exceed the maximum speed, the first speed will be set at the maximum speed. In some embodiments, a predetermined relationship between different nominal operating speeds and different load levels are established and stored with the genset for reference. The processor may refer the power-speed relationship to determine the first speed of the engine, the power being the actual power demand of the load plus the margin corresponding to the threshold.

At process 406, the parameter of the output power of the genset is compared to the threshold over a plurality of changes in the demand of the load. As discussed above, a plurality of instances of voltage dips may be recorded over a period of time each associated with a load increase. The period of time may be, for example, an hour, a couple of hours, a few hours, a day, a few days, a week, and so on, depending on the setting where the genset is used. The value of the parameter for comparison can be an average, a median, or any suitable combination of all or some of the values for the parameter recorded over the period of time.

If it is determined at process 406 that the parameter is less than the threshold, the method 400 proceeds to process 408 where the engine controller determines to reduce the speed of the engine from the first speed to a second speed. If the magnitude of the voltage dips collected over the period of time is less that the threshold, it means that the speed margin set for the threshold may be greater than necessary and therefore may result in wasted fuel and unwanted emissions and noises. The engine controller may determine a second speed that has a speed margin to accept the actual load increase corresponding to the magnitude of voltage dips collected over the period of time. The second speed may be a speed that varies with the power demand of the load and includes a speed margin that can accept the actual load increase corresponding to the magnitude of voltage dips collected over the period of time, if the addition of the speed margin does not make the second speed beyond the maximum speed in the speed range. In some embodiments, a predetermined relationship between different nominal operating speeds and different load levels is established and stored with the genset for reference. The processor may refer the power-speed relationship to determine the second speed of the engine, the power being the actual power demand of the load plus the margin corresponding to the actual increase.

If it is determined at process 406 that the parameter is greater than or equal to the threshold, the method 400 proceeds to process 410 where the engine controller determines whether the first speed reaches the maximum speed at the upper extreme of the speed range for the genset.

If it is determined at process 410 that the first speed does reach the maximum speed, the method proceeds to process 412 where the engine controller determines not to change the speed of the engine because the engine should operate within the speed range and cannot exceed the maximum speed.

If it is determined at process 410 that the first speed does not reached the maximum speed, the method 400 proceeds to process 414 where the engine controller determines to increase the speed of the engine from the first speed to a second speed if the magnitude of the voltage dips collected over the period of time is greater that the threshold. The greater parameter means that the speed margin for the threshold might not be enough to cover the largest possible load increase and therefore may result in a stalled generator when the load increases. The engine controller may determine a second speed that has a speed margin to accept the actual load increase corresponding to the magnitude of voltage dips collected over the period of time. The second speed may be a speed that varies with the power demand of the load and includes a speed margin that can accept the actual load increase corresponding to the magnitude of voltage dips collected over the period of time if the addition of the speed margin does not make the second speed beyond the maximum speed in the speed range. In some embodiments, a predetermined relationship between different nominal operating speeds and different load levels are established and stored with the genset for reference. The processor may refer the power-speed relationship to determine the second speed of the engine, the power being the actual power demand of the load plus the margin corresponding to the actual increase.

Optionally, the method 400 can further include a process of monitoring the ambient condition and a process of determining whether to adjust the speed of the engine in response to the detected ambient condition. As discussed above, the target speed of the engine may be changed in response to ambient conditions in order to achieve optimized performance and durability of the genset. The ambient condition (e.g., the ambient temperature) may be monitored for the engine. If the temperature of electronic components and/or the engine exceeds a threshold, which indicates that the genset is operating at a high load in a hot ambient, the operating speed of the engine will be increased in order to increase cooling air. In this manner, the target speed of the engine may be continuously and adaptively modified.

It should be noted that the processes of the methods described herein may be utilized with the other methods, although described in regard to a particular method. It should further be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Certain operations of the engine controller 200 described herein include operations to determine one or more parameters. Determining, as utilized herein, includes receiving values by any method in the art, including at least receiving values from a dataline or network communication, receiving an electric signal (e.g., a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Example and non-limiting circuit implementation elements include sensors (e.g., coupled to the components and/or systems in FIGS. 1 and 2) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuit specification, any actuator including at least an electrical, hydraulic, or pneumatic actuator, a solenoid, an op-amp, analog control elements (springs, filters, integrators, adders, dividers, gain elements), and/or digital control elements.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

While this specification contains specific implementation details, these should not be construed as limitations on the scope of any inventions or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer), partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method, comprising:
recording a load response history comprising changes in a voltage of a generator set over a plurality of changes in demand of a load;
determining a threshold for a magnitude of a voltage decrease of an output power of the generator set;
operating an engine of the generator set at a first speed to provide the output power to a load;
comparing the magnitude of the voltage decrease to the threshold over the plurality of changes in a demand of the load reflected in the load response history; and
determining whether to adjust a speed of the engine in response to the comparison of the magnitude of the voltage decrease to the threshold over the plurality of changes in the demand of the load reflected in the load response history, wherein determining whether to adjust the speed of the engine comprises at least one of the following:
reducing the speed of the engine from the first speed to a second speed lower than the first speed in response to determining the magnitude of the voltage decrease is less than the threshold;
determining not to adjust the speed of the engine in response to determining the magnitude of the voltage decrease is greater than the threshold; or
increasing the speed of the engine from the first speed to a third speed greater than the first speed in response to determining the magnitude of the voltage decrease is greater than the threshold.

2. The method of claim 1, wherein the changes in the demand of the load are in response to an air conditioner compressor motor starting.

3. The method of claim 1, wherein determining whether to adjust the speed of the engine comprises reducing the speed of the engine from the first speed to the second speed in response to determining the magnitude of the voltage decrease is less than the threshold.

4. The method of claim 1, wherein determining whether to adjust the speed of the engine in response to the comparison comprises determining not to adjust the speed of the engine in response to determining the magnitude of the voltage decrease is greater than the threshold.

5. The method of claim 1, wherein determining whether to adjust the speed of the engine comprises increasing the speed of the engine from the first speed to the third speed in response to determining the magnitude of the voltage decrease is greater than the threshold.

6. The method of claim 1, further comprising monitoring an ambient condition and determining whether to adjust the speed of the engine in response to the ambient condition.

7. The method of claim 6, wherein the ambient condition comprises an ambient temperature, and wherein determining whether to adjust the speed in response to the ambient condition comprises determining to increase the speed from the first speed to the second speed in response to the ambient temperature exceeding a threshold temperature.

8. The method of claim 1, wherein the threshold is determined based on a pattern of the load response history.

9. An apparatus comprising:
circuitry configured to:
record a load response history comprising changes in a voltage of a generator set over a plurality of changes in demand of a load;
determine a threshold for a magnitude of a voltage decrease of an output power of the generator set;
operate an engine of the generator set at a first speed to provide the output power to a load;
compare the magnitude of the voltage decrease to the threshold over the plurality of changes in a demand of the load reflected in the load response history; and
determine whether to adjust a speed of the engine in response to the comparison of the magnitude of the voltage decrease to the threshold over the plurality of changes in the demand of the load reflected in the load response history, wherein the circuitry is configured to do at least one of the following:
reduce the speed of the engine from the first speed to a second speed lower than the first speed in response to determining the magnitude of the voltage decrease is less than the threshold;
determine not to adjust the speed of the engine in response to determining the magnitude of the voltage decrease is greater than the threshold; or
increase the speed of the engine from the first speed to a third speed greater than the first speed in response to determining the magnitude of the voltage decrease is greater than the threshold.

10. The apparatus of claim 9, wherein the circuitry is configured to reduce the speed of the engine from the first speed to the second speed in response to determining the magnitude of the voltage decrease is less than the threshold.

11. The apparatus of claim 9, wherein the circuitry is configured to determine not to adjust the speed of the engine in response to determining the magnitude of the voltage decrease is greater than the threshold.

12. The apparatus of claim 9, wherein the circuitry is configured to increase the speed of the engine from the first speed to the third speed in response to determining the magnitude of the voltage decrease is greater than the threshold.

13. The apparatus of claim 9, wherein the circuitry is further configured to monitor an ambient condition and determine whether to adjust the speed of the engine in response to the ambient condition.

14. The apparatus of claim 13, wherein the ambient condition comprises an ambient temperature, and wherein the circuitry is configured to determine to increase the speed from the first speed to the second speed in response to the ambient temperature exceeding a threshold temperature.

15. A generator set, comprising:
an engine;
a generator coupled to the engine and driven by the engine to generate electrical power; and
a controller communicably coupled to the engine and configured to:
record a load response history comprising changes in a voltage of the generator set over a plurality of changes in demand of a load;
determine a threshold for a magnitude of a voltage decrease of an output power of the generator set;
operate the engine of the generator set at a first speed to provide the output power to a load;
compare the magnitude of the voltage decrease to the threshold over the plurality of changes in a demand of the load reflected in the load response history; and determine whether to adjust a speed of the engine in response to the comparison of the magnitude of the voltage decrease to the threshold over the plurality of changes in the demand of the load reflected in the load response history, wherein the controller is configured to do at least one of the following:

reduce the speed of the engine from the first speed to a second speed lower than the first speed in response to determining the magnitude of the voltage decrease is less than the threshold;

determine not to adjust the speed of the engine in response to determining the magnitude of the voltage decrease is greater than the threshold; or increase the speed of the engine from the first speed to a third speed greater than the first speed in response to determining the magnitude of the voltage decrease is greater than the threshold.

16. The generator set of claim 15, wherein the controller is configured to reduce the speed of the engine from the first speed to the second speed in response to determining the magnitude of the voltage decrease is less than the threshold.

17. The generator set of claim 15, wherein the controller is configured to either determine not to adjust the speed of the engine or to increase the speed of the engine from the first speed to the third speed in response to determining the magnitude of the voltage decrease is greater than the threshold.

18. The generator set of claim 15, wherein the controller is further configured to:

monitor an ambient temperature; and determine to increase the speed from the first speed in response to the ambient temperature exceeding a threshold temperature.

* * * * *